US012748254B2

(12) United States Patent
Huang et al.

(10) Patent No.: US 12,748,254 B2
(45) Date of Patent: Sep. 29, 2026

(54) OPTICAL FILM SET, BACKLIGHT MODULE AND DISPLAY DEVICE

(71) Applicant: Radiant Opto-Electronics Corporation, Kaohsiung City (TW)

(72) Inventors: Chien-Chih Huang, Kaohsiung City (TW); Po-Chang Huang, Kaohsiung City (TW); Chia-Yin Chang, Kaohsiung City (TW)

(73) Assignee: Radiant Opto-Electronics Corporation, Kaohsiung City (TW)

( * ) Notice: Subject to any disclaimer, the term of this patent is extended or adjusted under 35 U.S.C. 154(b) by 223 days.

(21) Appl. No.: 18/735,201

(22) Filed: Jun. 6, 2024

(65) Prior Publication Data

US 2024/0329291 A1 Oct. 3, 2024

Related U.S. Application Data

(63) Continuation of application No. PCT/CN2021/136657, filed on Dec. 9, 2021.

(51) Int. Cl.
*F21V 8/00* (2006.01)

(52) U.S. Cl.
CPC .................................. *G02B 6/0053* (2013.01)

(58) Field of Classification Search
CPC .................................................... G02B 6/0053
See application file for complete search history.

(56) References Cited

U.S. PATENT DOCUMENTS

2007/0019436 A1* 1/2007 Chen .................... G02B 6/0038 362/615
2007/0115570 A1 5/2007 Hwang et al.
2009/0002592 A1 1/2009 Ma et al.
2010/0118519 A1 5/2010 Yi et al.

FOREIGN PATENT DOCUMENTS

CN 101063772 A 10/2007
CN 102620212 A 8/2012
CN 103631052 A 3/2014
CN 108490692 A 9/2018
CN 111679352 A 9/2020
CN 212229385 U 12/2020

(Continued)

OTHER PUBLICATIONS

CN 213069419 U machine translation (Year: 2021).*

*Primary Examiner* — James A Dudek
(74) *Attorney, Agent, or Firm* — CKC & Partners Co., LLC

(57) ABSTRACT

An optical film set is configured to guide light from a light guide plate in a backlight module. The optical film set includes a lower prism film and an upper prism film. The lower prism film has plural lower prism structures, and each of the lower prism structures extends along a first direction. The upper prism film is disposed above the lower prism film. The upper prism film has plural upper prism structures, and each of the upper prism structures extends along a second direction. The second direction is different from the first direction. There is an included angle between the second direction and an extending direction of a light-incident surface of the light guide plate. The included angle is in a range from 25 degrees to 50 degrees or a range from 130 degrees to 155 degrees including the end point values.

9 Claims, 6 Drawing Sheets

(56) References Cited

FOREIGN PATENT DOCUMENTS

| | | | |
|---|---|---|---|
| CN | 112219141 | A | 1/2021 |
| CN | 213069419 | U | 4/2021 |
| CN | 216816995 | U | 6/2022 |
| KR | 20050027676 | A | 3/2005 |
| TW | 201837557 | A | 10/2018 |
| TW | M608390 | U | 3/2021 |
| TW | I738465 | B | 9/2021 |
| TW | M616691 | U | 9/2021 |
| WO | 2012014849 | A1 | 2/2012 |

* cited by examiner

OPTICAL FILM SET, BACKLIGHT MODULE AND DISPLAY DEVICE

RELATED APPLICATIONS

This application is a continuation application of International application No. PCT/CN2021/136657, filed Dec. 9, 2021, the content of which is incorporated herein by reference in its entirety.

BACKGROUND

Field of Invention

The present disclosure relates to a film set and its applications, and more particularly to a film set that can be applied to a backlight module, and a backlight module and a display device using the film set.

Description of Related Art

A typical backlight module mainly includes a light guide plate and several optical films, and the light emitted from the light guide plate is refracted by the optical films to emit light at a front view angle. However, such backlight module cannot be applied to anti-peeping display products. Therefore, how to achieve a good anti-peeping effect by changing the design of the optical films and the light guide plate has become a goal of the relevant industries.

SUMMARY

Therefore, one objective of the present disclosure is to provide an optical film set, and a backlight module and a display device using the optical film set. Through the design of the optical film set, the amount of light emitted at the front view angle can be maintained and the stray light emitted from the side can be reduced.

According to the aforementioned objectives of the present disclosure, an optical film set is provided, which is configured to guide light from a light guide plate of a backlight module. The optical film set includes a lower prism film and an upper prism film. The lower prism film has plural lower prism structures, and each of the lower prism structures extends along a first direction. The upper prism film is disposed above the lower prism film, wherein the upper prism film has plural upper prism structures, and each of the upper prism structures extends along a second direction, wherein the second direction is different from the first direction. There is an included angle between the second direction and an extending direction of a light-incident surface of the light guide plate, and the included angle is in a range from 25 degrees to 50 degrees or a range from 130 degrees to 155 degrees.

According to one embodiment of the present disclosure, there is an included angle, which is ranging from 115 degrees to 140 degrees or from 220 degrees to 245 degrees, between the first direction and the extending direction of the light-incident surface of the light guide plate.

According to one embodiment of the present disclosure, the first direction and the second direction are perpendicular to each other.

According to one embodiment of the present disclosure, the optical film set further includes a lower diffuser disposed under the lower prism film, the lower diffuser includes plural diffusion particles, and the diffusion particles make the lower diffuser have a haze ranging from 50% to 60%.

According to one embodiment of the present disclosure, the optical film set further includes an upper diffuser disposed above the upper prism film. The upper diffuser includes plural diffusion particles, and the diffusion particles make the upper diffuser have a haze equal to or smaller than 30%.

According to one embodiment of the present disclosure, the optical film set further includes a lower diffuser and an upper diffuser. A haze ratio of the lower diffuser to the upper diffuser is ranging from 1.6 to 6.

According to one embodiment of the present disclosure, the lower diffuser is disposed under the lower prism film, and the upper diffuser is disposed above the upper prism film. After the light from the light guide plate passes through the lower diffuser, the lower prism film, the upper prism film, and the upper prism film in sequence, a portion of the light is emitted from the upper diffuser along a front view direction, and another portion of the light is emitted from the upper diffuser along a side view direction, wherein a ratio of an amount of the light emitted from the side view direction to an amount of the light emitted from the front view direction is smaller than 0.07.

According to one embodiment of the present disclosure, the front view direction is parallel to a light normal line of the upper diffuser, and there is an included angle, which is greater than 45 degrees, between the side view direction and the light normal line.

According to one embodiment of the present disclosure, each of the lower prism structures and the upper prism structures is a strip structure.

According to the aforementioned objectives of the present disclosure, a backlight module is provided. The backlight module includes a light guide plate, a light source, and the aforementioned optical film set. The light guide plate has a light-incident surface and a light-emitting surface. The light source is disposed adjacent to the light-incident surface. The optical film is disposed above the light-emitting surface.

According to the aforementioned objectives of the present disclosure, a display device is provided. The display device includes a light guide plate, a light source, the aforementioned optical film set, and a display panel. The light guide plate has a light-incident surface and a light-emitting surface. The light source is disposed adjacent to the light-incident surface. The optical film set is disposed above disposed above the light-emitting surface of the light guide plate. The display panel is disposed above the optical film set.

According to the aforementioned description, it is known that the optical film set of the present disclosure mainly designs the included angle between the extending direction of the upper prism structures of the upper prism film and the light-incident surface, and changes the included angle between the extending direction of the lower prism structures of the lower prism film and the light-incident surface, so as to reduce the amount of light emitted at the side view angle while maintaining the amount of light emitted at the front view angle to meet the optical requirements of anti-peeping display. In addition, when used with diffusers of different hazes, the combination of the upper prism film and the lower prism film of the present disclosure can further achieve the effect of reducing the stray light emitted at the side view angle.

BRIEF DESCRIPTION OF THE DRAWINGS

For a better understanding of the embodiments and their advantages, reference is now made to the following description taken in conjunction with the accompanying drawings, in which.

DETAILED DESCRIPTION

Figure 1:
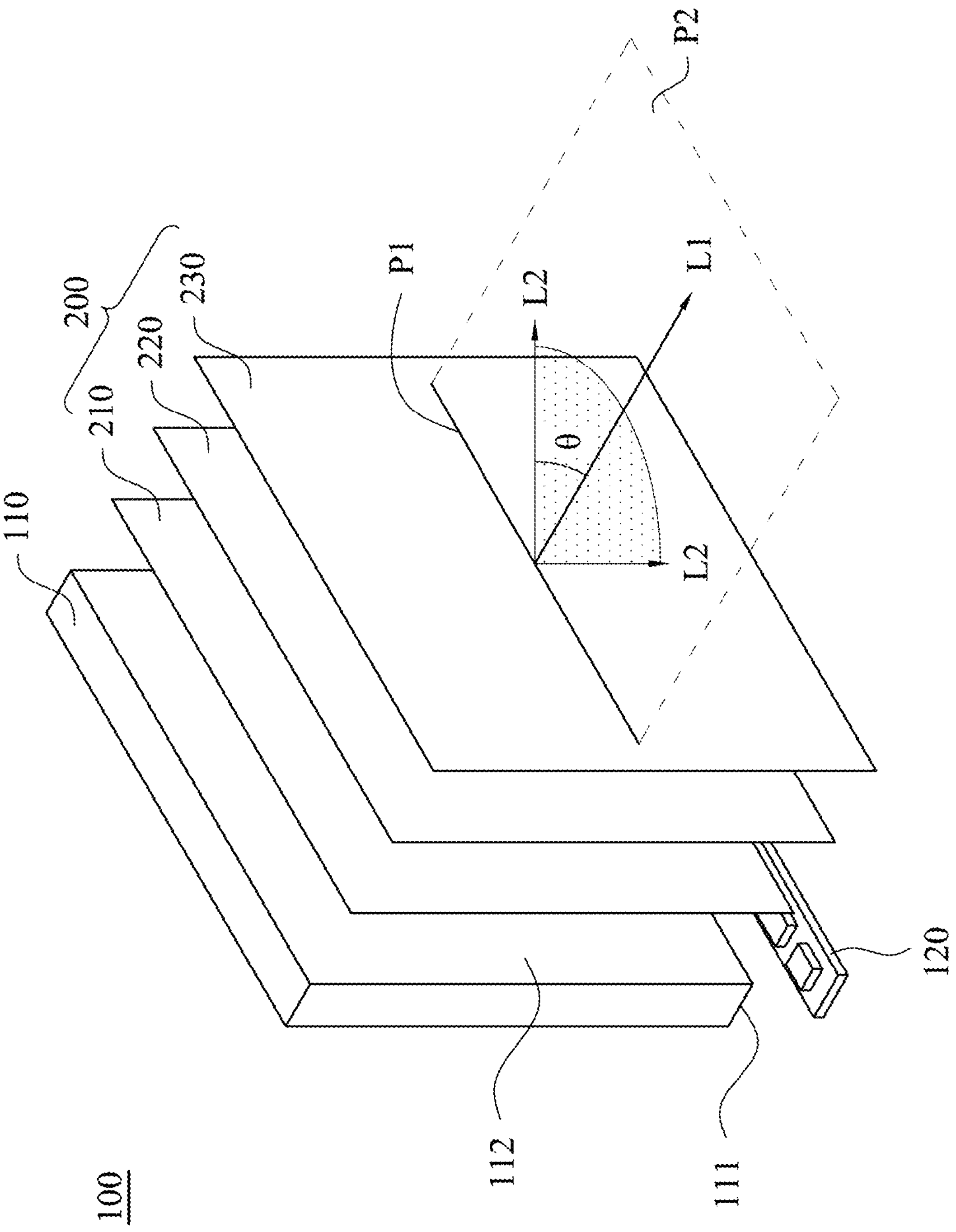
FIG. 1 is a schematic diagram of a backlight module in accordance with a first embodiment of the present disclosure.

Referring to FIG. 1, FIG. 1 is a schematic diagram of a backlight module in accordance with a first embodiment of the present disclosure. The backlight module 100 of the present embodiment mainly includes a light guide plate 110, a light source 120, and an optical film set 200. The light source 120 is mainly used to provide light to the light guide plate 110, and the optical film set 200 is disposed in front of the light guide plate 110. The optical film set 200 is mainly used to reduce the amount of the light emitted from the light guide plate 110 at the side view angle, and maintain the amount of the light emitted from the light guide plate 110 at the front view angle, such that the backlight module 100 can be applied to anti-peeping display products or privacy display products.

As shown in FIG. 1, the light guide plate 110 has a light-incident surface 111 and a light-emitting surface 112. The light source 120 is adjacent to the light-incident surface 111, and the light provided by the light source 120 enters the light guide plate 110 from the light-incident surface 111 of the light guide plate 110 and is emitted from the light-emitting surface 112 of the light guide plate 110. In the present embodiment, the optical film set 200 includes a lower diffuser 210, a lower prism film 220, and an upper prism film 230, wherein the lower diffuser 210, the lower prism film 220, and the upper prism film 230 are stacked in front of the light-emitting surface 112 of the light guide plate 110 in sequence.

Figure 2:
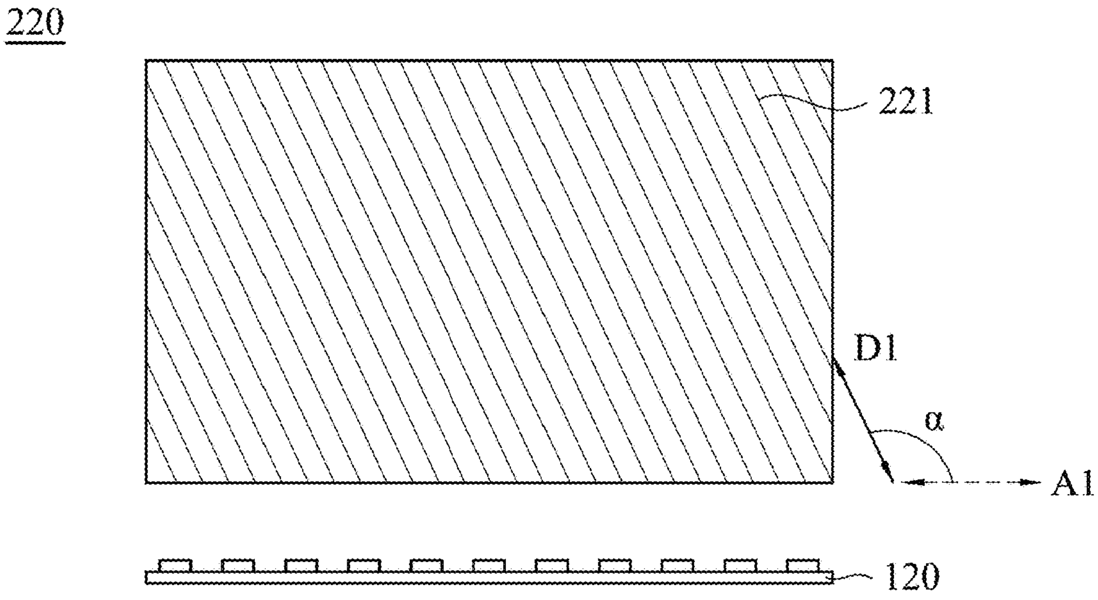
FIG. 2 is a front view of a lower prism film in accordance with the first embodiment of the present disclosure.
Figure 3:
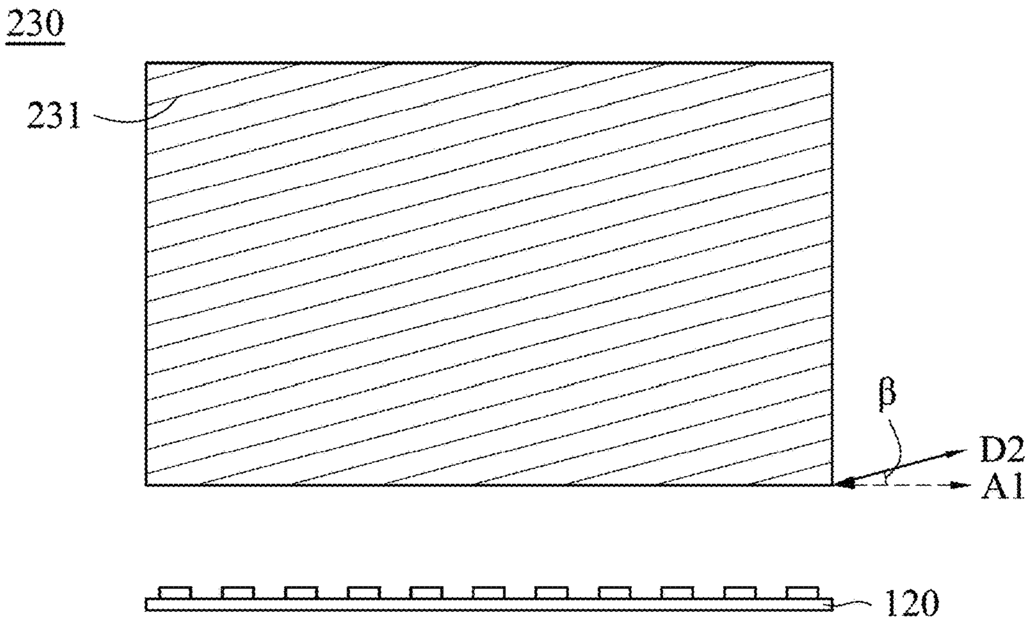
FIG. 3 is a front view of an upper prism film in accordance with the first embodiment of the present disclosure.

Referring to FIG. 2 and FIG. 3, FIG. 2 and FIG. 3 respectively illustrate front views of a lower prism film and an upper prism film in accordance with the first embodiment of the present disclosure. In the present embodiment, the lower prism film 220 has plural lower prism structures 221, and each of the lower prism structures 221 is a strip structure and extends along a first direction D1. There is an included angle α between the first direction D1 and an extending direction A1 of the light-incident surface 111 of the light guide plate 110. The upper prism film 230 has plural upper prism structures 231, and each of the upper prism structures 231 is a strip structure and extends along a second direction D2. The second direction D2 is different from the first direction D1. There is an included angle β between the second direction D2 and the extending direction A1 of the light-incident surface 111 of the light guide plate 110. In the present embodiment, the included angle β ranges from 25 degrees to 50 degrees or from 130 degrees to 155 degrees, including the end point values. Thus, after the light emitted from the light-emitting surface 112 of the light guide plate 110 passes through the lower diffuser 210, the lower prism film 220 and the upper prism film 230 in sequence, a portion of the light (for example, light L1 in FIG. 1) is emitted from the upper prism film 230 along a front view direction (or front view angle), and another portion of the light (for example, light L2 in FIG. 1) is emitted from the upper prism film 230 along a side view direction (or side view angle). For example, when an user faces the backlight module 100 as shown in FIG. 1, the user looks directly at a center position of the backlight module 100, there is an extending line P1 passing through the center position on the light-emitting surface 112 of the backlight module 100, and a plane P2 formed by the extending line P1 and the front view direction (the plane P2 includes a shaded area in FIG. 1) has a side view direction. The front view direction herein is referred to a direction of the light parallel to a normal line of the upper prism film 230, and there is an included angle θ between the side view direction and the front view direction on the plane P2.

Figure 4:
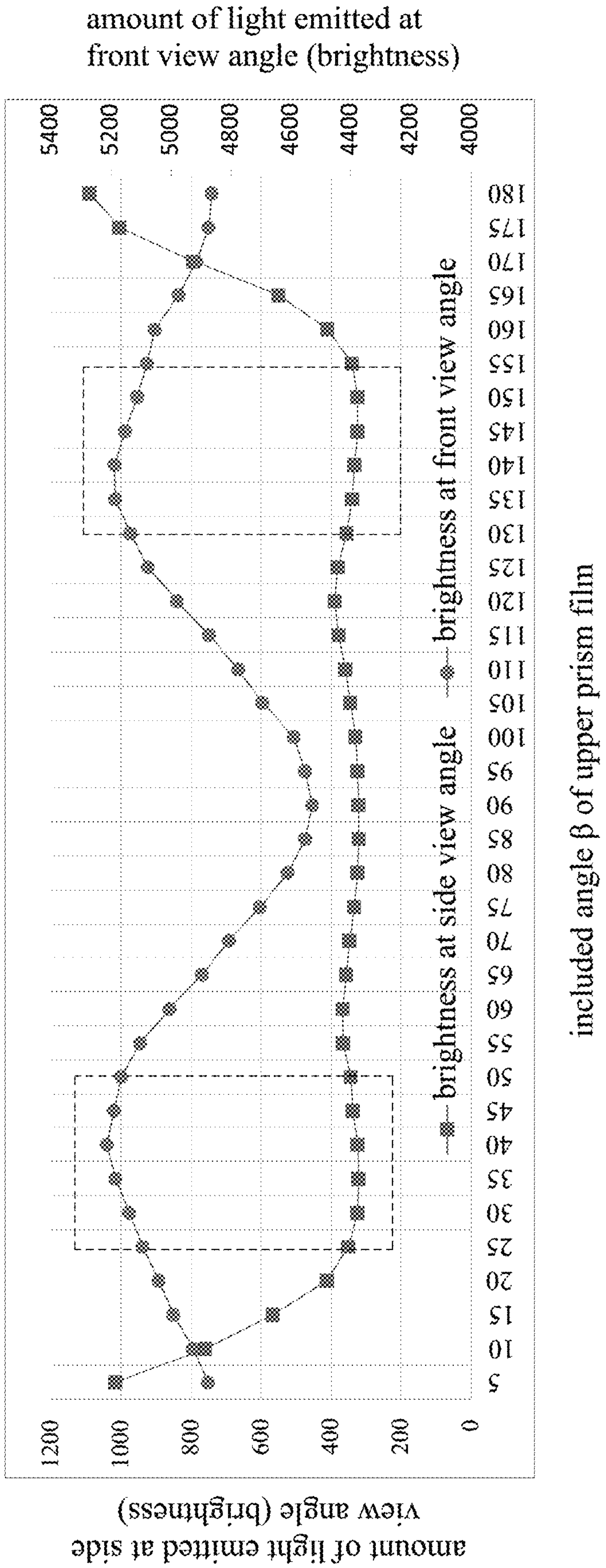
FIG. 4 is a diagram illustrating a comparison of the brightness of the front view angle and the brightness of the side view angle based on the included angle design of the upper prism film in accordance with the first embodiment of the present disclosure.

Referring to FIG. 4, FIG. 4 is a diagram illustrating a comparison of the brightness of the front view angle and the brightness of the side view angle based on the included angle design of the upper prism film in accordance with the first embodiment of the present disclosure. It can be known from FIG. 4, when the included angle β of the upper prism film 230 ranges from 25 degrees to 50 degrees or from 130 degrees to 155 degrees (that is, the ranges enclosed by the dotted boxes in FIG. 4), the entire backlight module 100 can have a larger front-view luminance and a smaller side view luminance, such that a ratio of the amount of the light emitted from the side view direction to the amount of the light emitted from the front view direction (also referred to a ratio of the light emitted at the side view angle) is relatively small. This means that the amount of lateral light can be reduced by designing the included angle β of the upper prism film 230 within the range, which is from 25 degrees to 50 degrees or from 130 degrees to 155 degrees.

Referring to Table 1 and Table 2 below, Table 1 and Table 2 list the light-emitting results of the light L1 and the light L2 generated by various combinations of the included angle α of the lower prism film 220 and the included angle β of the upper prism film 230.

TABLE 1

| | | | | | | |
|---|---|---|---|---|---|---|
| included angle β | 25 | 30 | 35 | 40 | 45 | 50 |
| included angle α | 115 | 120 | 125 | 130 | 135 | 140 |
| amount of light emitted at front view angle (brightness) | 5095 | 5139 | 5185 | 5214 | 5190 | 5166 |
| amount of light emitted at side view angle (brightness) | 349.5 | 324 | 320.5 | 323 | 337 | 342.5 |
| ratio of light emitted at side view angle | 6.85% | 6.30% | 6.18% | 6.19% | 6.49% | 6.63% |

TABLE 2

| | | | | | | |
|---|---|---|---|---|---|---|
| included angle β | 130 | 135 | 140 | 145 | 150 | 155 |
| included angle α | 220 | 225 | 230 | 235 | 240 | 245 |
| amount of light emitted at front view angle | 5135 | 5186 | 5188 | 5153 | 5113 | 5080 |

TABLE 2-continued

| | | | | | | |
|---|---|---|---|---|---|---|
| (brightness) amount of light emitted at side view angle (brightness) | 354.5 | 338.5 | 332.5 | 323 | 323.5 | 339 |
| ratio of light emitted at side view angle | 6.90% | 6.53% | 6.41% | 6.27% | 6.33% | 6.67% |

According to Table 1 and Table 2, it can be seen that when the included angle β of the upper prism film 230 ranges from 25 degrees to 50 degrees or from 130 degrees to 155 degrees, the ratio of the light emitted at the side view angle is smaller than 10%, or even smaller than 7%, which can meet the requirements of anti-peeping products. Thus, it can be known that the included angle α of the lower prism film 220 can be designed to be from 115 degrees to 140 degrees or from 220 degrees to 245 degrees including the end point values; or the second direction D2 of the upper prism structures 231 of the upper prism film 230 and the first direction D1 of the lower prism structures 221 of the lower prism film 220 can be designed to be perpendicular to each other to achieve the effect of reducing the ratio of the light emitted at the side view angle as mentioned above.

Figure 5:
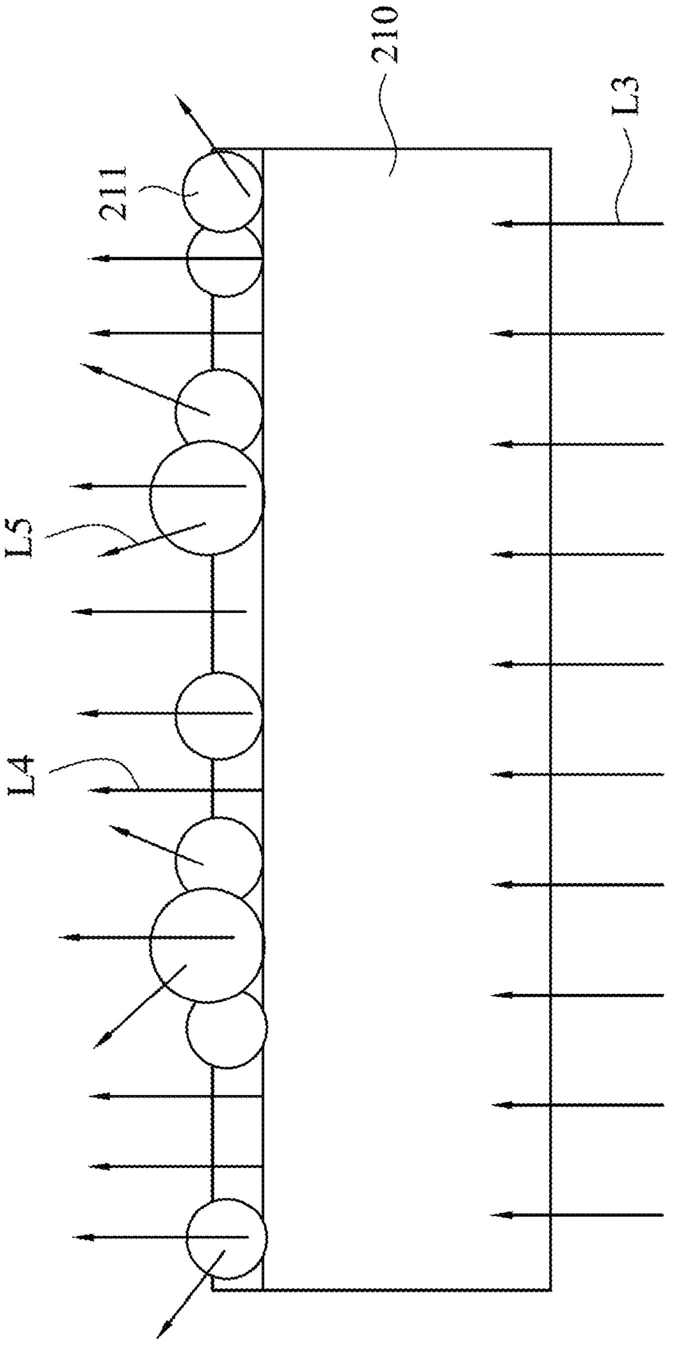
FIG. 5 is a side view of a lower diffuser in accordance with the first embodiment of the present disclosure.

Referring to FIG. 5, FIG. 5 is a side view of a lower diffuser in accordance with the first embodiment of the present disclosure. In one embodiment, the lower diffuser 210 includes plural diffusion particles 211. The lower diffuser 210 of the present disclosure may mainly be used to reduce the stray light emitted at the side view angle (that is, the included angle θ between the front view direction and the side view direction is greater than 45 degrees). The stray light is referred to the diffusion of light caused by the diffusion particles 211 and is the light that has no specific direction. When the parallel light L3 enters the lower diffuser 210, a portion of the light (for example, light L4) passes through the lower diffuser 210 in parallel, and another portion of the light (for example, light L5) is scattered by the diffusion particles 211 to pass through the lower diffuser 210, wherein the light L5 is referred to the light having a deviation angle greater than 2.5 degrees relative to the parallel light L3. A ratio of the transmittance of the light L5, which is scattered to pass through the lower diffuser 210, to the sum of the transmittance of the light L4 and the light L5 can be defined as a haze of the lower diffuser 210. In the present embodiment, the lower diffuser 210 has a haze of 50% to 60%, including the end point values. When the haze of the diffuser 210 is 0%, although it also can achieve a lower ratio of light emitted at the side view angle, the uniformity on the light-emitting surface close to the light-incident side cannot meet the requirement. In addition, when the haze of the diffuser 210 is 90%, although it can achieve a lower ratio of light emitted at the side view angle, the brightness of the light at the front view angle cannot meet the requirement, and the stray light measured at the side view angle is larger, which reduces the anti-peeping effect of the product. Therefore, when the haze of the lower diffuser 210 is between 50% and 60%, it can satisfy the anti-peeping purpose of the product and generate less stray light at the side view angle. It should be noted that, compared with the conventional backlight module that uses the lower diffuser with a high haze, such as a lower diffuser with a haze of 90%, which tends to generate more stray light, the present disclosure uses the lower diffuser with a low haze from 50% to 60%, which not only meets the optical appearance required by customers, but also reduces stray light, thereby meeting the requirement of anti-peeping products.

Figure 6:
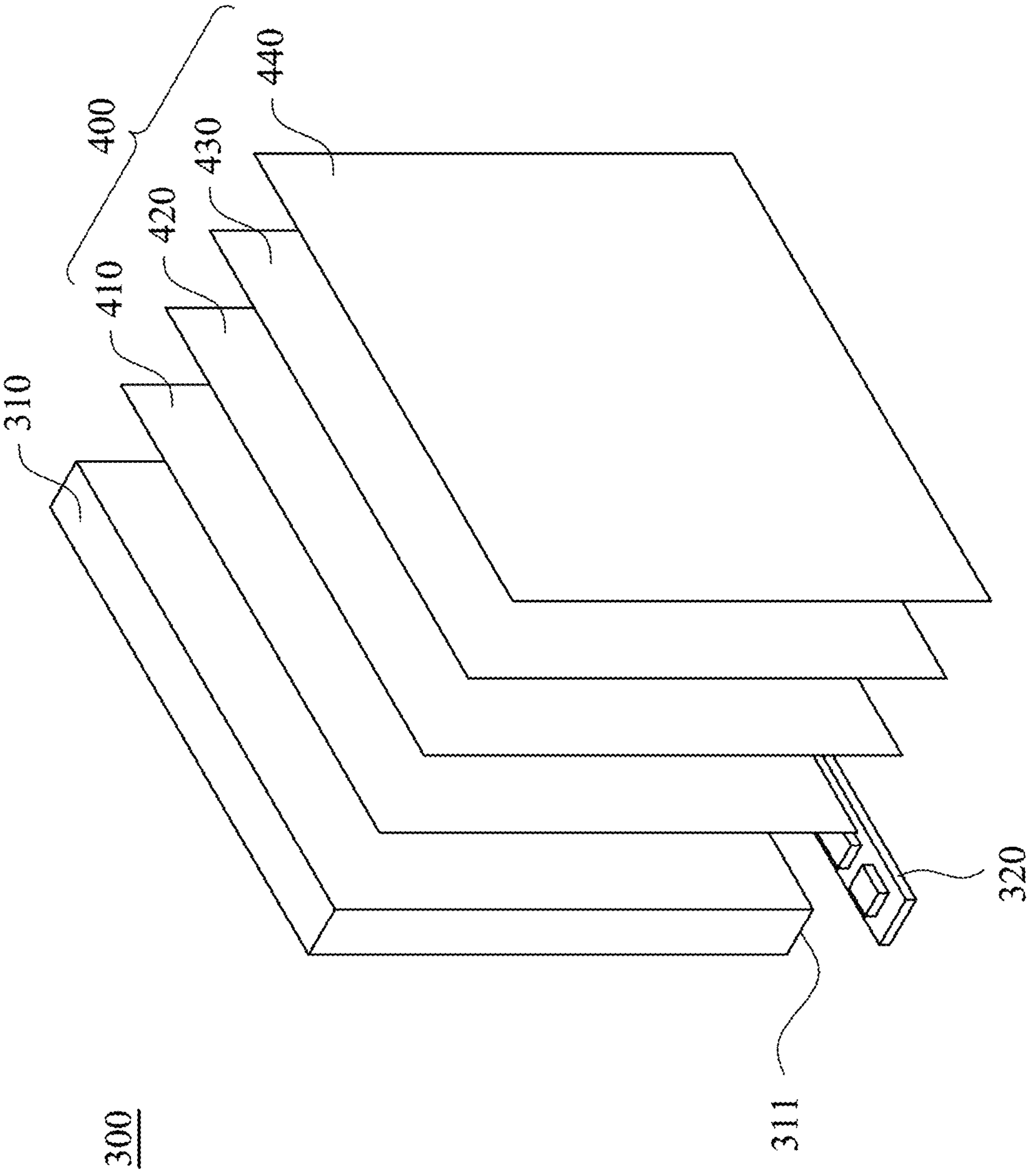
FIG. 6 is a schematic diagram of a backlight module in accordance with a second embodiment of the present disclosure.

The backlight module of the present disclosure may have different structural designs. Referring to FIG. 6, FIG. 6 is a schematic diagram of a backlight module in accordance with a second embodiment of the present disclosure. The structure of the backlight module 300 of the present embodiment is substantially the same as the structure of the backlight module 100 shown in FIG. 1, and the difference is that the backlight module 300 further includes an upper diffuser 440. As shown in FIG. 6, the backlight module 300 mainly includes a light guide plate 310, a light source 320, and an optical film set 400. The light source 320 may mainly be used to provide light to the light guide plate 310, and the optical film set 400 is disposed in front of the light guide plate 310. The optical film set 400 is mainly used to reduce the amount of light emitted from the light guide plate 310 at the side view angle, and at least maintain the amount of light emitted from the light guide plate 310 at the front view angle, such that the backlight module 300 can be applied to anti-peeping display products.

As shown in FIG. 6, in the present embodiment, the optical film set 400 includes a lower diffuser 410, a lower prism film 420, an upper prism film 430, and an upper diffuser 440, wherein the lower diffuser 410, the lower prism film 420, the upper prism film 430, and the upper diffuser 440 are sequentially stacked in front of the light-emitting surface of the light guide plate 310. The structures of the lower prism film 420 and the upper prism film 430 are substantially the same as those of the lower prism film 220 and the upper prism film 230 shown in FIG. 1 to FIG. 3, and will not be repeated herein. In the present embodiment, the upper diffuser 440 is used to ensure that anti-peeping display products can have better optical quality, such as better uniformity. Particularly, the haze of the upper diffuser 440 is smaller than that of the lower diffuser 410, which can ensure that the light emitted from the upper diffuser 440 does not generate too much stray light, such that products using the optical film set 400 of the present disclosure can meet anti-peeping properties.

In the present disclosure, the lower diffuser 410 and the upper diffuser 440 have diffusion particles 211 as shown in FIG. 5. The diffusion particles 211 can make the lower diffuser 410 have a haze of 50% to 60% (including the end point values), and a haze of the upper diffuser 440 be smaller than that of the lower diffuser 410, which is smaller than 30%, for example. Referring to Table 3, Table 3 shows the amounts of stray light as the changing of the hazes of the lower diffuser 410 and the upper diffuser 440 under the condition that the included angle between the prism structures of the upper prism film 430 and the extending direction of the light-incident surface 311 of the light guide plate 310 ranges from 25 degrees to 50 degrees or from 130 degrees to 155 degrees. The amounts of stray light are still within the allowable range of the anti-peeping product. It can be seen from Table 3, when the haze of the lower diffuser 410 is between 50% and 60%, and the haze of the upper diffuser 440 is smaller than 30% (including the end point values), it can generate less stray light. In addition, it also can be inferred from the results in Table 3, when the haze ratio of the lower diffuser 410 and the upper diffuser 440 ranges from 1.6 to 6, it can meet the anti-peeping characteristics of the product, generate less stray light, and enhance the optical quality of the backlight module 300 of the present disclosure, such that better uniformity.

TABLE 3

| haze of lower | haze of upper diffuser | | | |
|---|---|---|---|---|
| diffuser | 10 | 15 | 30 | 70 |
| 50 | 5.72% | 6.07% | 6.46% | 8.83% |
| 60 | 5.91% | 6.24% | 6.53% | 8.92% |
| 90 | 6.88% | 7.22% | 7.52% | 9.86% |

Figure 7:
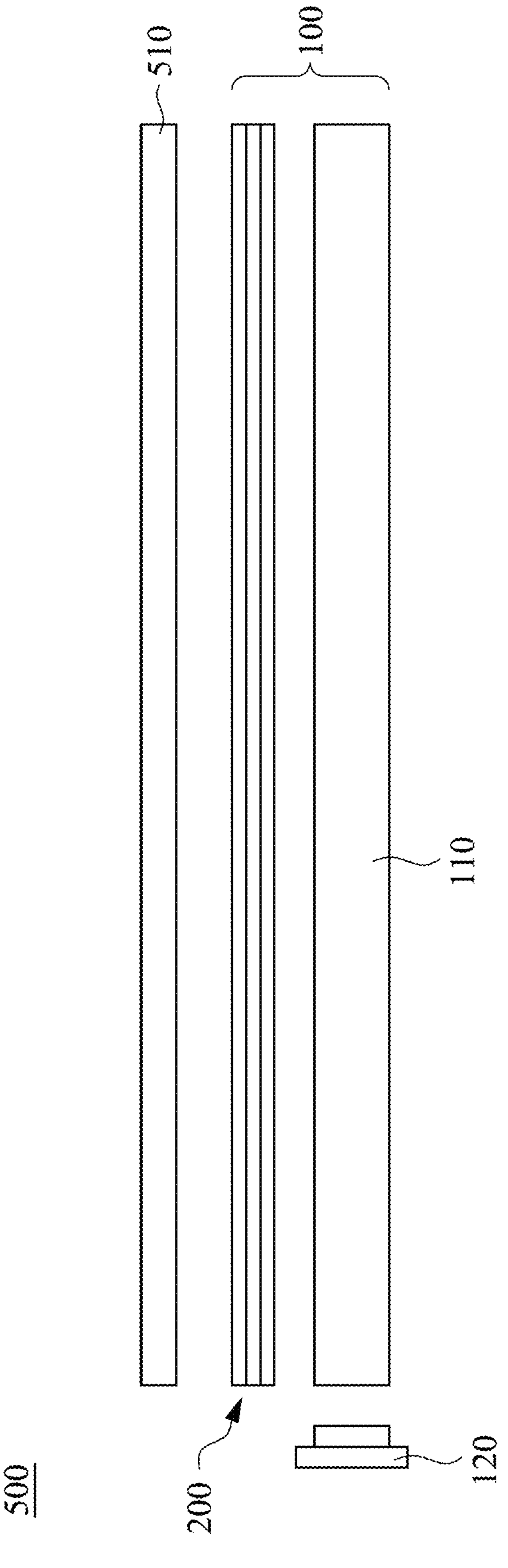
FIG. 7 is a schematic diagram of a display device in accordance with an embodiment of the present disclosure.

Referring to FIG. 7, FIG. 7 is a schematic diagram of a display device in accordance with an embodiment of the present disclosure. The display device 500 of the present embodiment includes the backlight module 100 and the display panel 510 as shown in FIG. 1. The display panel 510 is disposed in front of the backlight module 100. Thus, the design of the optical film set 200 in the backlight module 100 of the display device 500 can also achieve the purpose of maintaining the amount of light emitted at the front view angle and reducing the amount of light emitted at the side view angle, so the details are repeated herein. In the present embodiment, the backlight module 100 shown in FIG. 1 is applied in the display device 500 only for illustrative purposes and is not intended to limit the present disclosure. The backlight modules of the other aforementioned embodiments (such as the backlight module 300 shown in FIG. 6) can be applied in display devices to provide the same anti-peeping effect.

According to the aforementioned embodiments of the present disclosure, it is known that the optical film set of the present disclosure mainly designs the included angle between the extending direction of the upper prism structures of the upper prism film and the light-incident surface, and changes the included angle between the extending direction of the lower prism structures of the lower prism film and the light-incident surface, so as to reduce the amount of light emitted from the side view angle while maintaining the amount of light emitted at the front view angle to meet the optical requirements of anti-peeping display. In addition, when used with diffusers of different hazes, the combination of the upper prism film and the lower prism film of the present disclosure can further achieve the effect of reducing the stray light emitted at the side view angle.

Although the present disclosure has been disclosed above with embodiments, it is not intended to limit the present disclosure. Any person having ordinary skill in the art can make various changes and modifications without departing from the spirit and scope of the present disclosure. Therefore, the protection scope of the present disclosure should be defined by the scope of the appended claims.

What is claimed is:

1. An optical film set configured to guide light from a light guide plate of a backlight module, wherein the optical film set comprises:

a lower prism film, wherein the lower prism film has a plurality of lower prism structures, and each of the lower prism structures extends along a first direction;

an upper prism film disposed above the lower prism film, wherein the upper prism film has a plurality of upper prism structures, and each of the upper prism structures extends along a second direction, wherein the second direction is different from the first direction, and there is an included angle between the second direction and an extending direction of a light-incident surface of the light guide plate, wherein the included angle is in a range from 25 degrees to 50 degrees or a range from 130 degrees to 155 degrees including the end point values;

a lower diffuser disposed under the lower prism film; and an upper diffuser disposed above the upper prism film, wherein the upper diffuser comprises a plurality of diffusion particles, and the diffusion particles of the upper diffuser make the upper diffuser have a haze smaller than 30% but not including the end point value;

wherein a haze ratio of the lower diffuser to the upper diffuser is ranging from 1.6 to 6 including the end point values.

2. The optical film set of claim 1, wherein there is an included angle, which is ranging from 115 degrees to 140 degrees or from 220 degrees to 245 degrees including the end point values, between the first direction and the extending direction of the light-incident surface of the light guide plate.

3. The optical film set of claim 2, wherein the first direction and the second direction are perpendicular to each other.

4. The optical film set of claim 1, wherein the lower diffuser comprises a plurality of diffusion particles, and the diffusion particles of the lower diffuser make the lower diffuser have a haze ranging from 50% to 60% including the end point values.

5. The optical film set of claim 1, wherein after the light from the light guide plate passes through the lower diffuser, the lower prism film, the upper prism film, and the upper diffuser in sequence, a portion of the light is emitted from the upper diffuser along a front view direction, and another portion of the light is emitted from the upper diffuser along a side view direction, wherein a ratio of an amount of the light emitted from the side view direction to an amount of the light emitted from the front view direction is smaller than 0.07.

6. The optical film set of claim 5, wherein the front view direction is parallel to a light normal line of the upper diffuser, and there is an included angle, which is greater than 45 degrees, between the side view direction and the light normal line.

7. The optical film set of claim 1, wherein each of the lower prism structures and the upper prism structures is a strip structure.

8. A backlight module, comprising:

a light guide plate having a light-incident surface and a light-emitting surface;

a light source disposed adjacent to the light-incident surface; and the optical film set of claim 1 disposed above the light-emitting surface.

9. A display device, comprising:

a light guide plate having a light-incident surface and a light-emitting surface;

a light source disposed adjacent to the light-incident surface;

the optical film set of claim 1 disposed above the light-emitting surface of the light guide plate; and a display panel disposed above the optical film set.

* * * * *